United States Patent [19]

Bashan et al.

[11] Patent Number: 5,241,160
[45] Date of Patent: Aug. 31, 1993

[54] SYSTEM AND METHOD FOR THE NON-CONTACT TRANSMISSION OF DATA

[75] Inventors: Oded Bashan, Karmiel; Moshe Aduk, Kiryat Shemona; Ronnie Gilboa, Moshav Beit-Hillel; Nehemya Itay, Kibbutz Kfar-Giladi; Dubi Shure, Kfar Vradim, all of Israel

[73] Assignee: On Track Innovations Ltd., Hevel Tefen, Israel

[21] Appl. No.: 908,942

[22] Filed: Jul. 6, 1992

Related U.S. Application Data

[63] Continuation of Ser. No. 636,086, Dec. 28, 1990, abandoned.

[51] Int. Cl.⁵ .............................................. G06K 5/00
[52] U.S. Cl. .................................. 235/380; 235/375; 235/492
[58] Field of Search ............... 235/375, 380, 384, 487, 235/492

[56] References Cited

U.S. PATENT DOCUMENTS

| | | | |
|---|---|---|---|
| 3,395,353 | 7/1968 | King | 307/234 |
| 4,497,068 | 1/1985 | Rischer | 307/234 |
| 4,857,760 | 8/1989 | Stuebing | 307/234 |
| 4,951,044 | 8/1990 | Nelson | 235/380 |

*Primary Examiner*—Harold Pitts
*Attorney, Agent, or Firm*—Helfgott & Karas

[57] ABSTRACT

A data transmission system for the non-contact transmission of data between a station and a portable data carrier. The station includes a station transmitter operating at a predetermined frequency for generating a first signal and a demodulator for detecting a second signal superimposed on the first signal. An antenna is coupled via a length of cable to the station transmitter via a matching circuit so as to be operative at said frequency regardless of the length of the cable. The portable data carrier includes supply means for coupling to a source of electric power and a data carrier tuned antenna circuit inductively coupled with the station transmitter so as to receive power from the station. A data carrier data modulator is provided for modulating the first signal with the second signal in response to data stored within the data carrier and, by means of said inductive coupling, enabling the data to be transmitted from the data carrier to the station.

21 Claims, 8 Drawing Sheets

SYSTEM AND METHOD FOR THE NON-CONTACT TRANSMISSION OF DATA

This is a continuation of application Ser. No. 07/636,086, filed Dec. 28, 1990 now abandoned.

FIELD OF THE INVENTION

This invention relates to electronic data communications systems and, in particular, to a non-contact system for two-way communication between a station and a portable data card. Non-contact communications systems do not require the portable data card to have physical contact with the station, but allow data transfer to be effected when the card is brought into close proximity with the station. Such data communication systems have been proposed for use in, for example, shop floor control systems, bank transaction systems and so on.

BACKGROUND OF THE INVENTION

In U.S. Pat. No. 3,299,424 (Vinding) there is disclosed an interrogator-responder identification system in which the responder is identified when inductively coupled to the interrogator. The inductive coupling is achieved by means of resonant circuits tuned to the same frequency within the responder and interrogator, thereby enabling non-contact communication between the two.

In a preferred embodiment the responder is self-powered, deriving its dc supply voltage by rectifying a portion of the induced interrogator signal.

Data stored within the responder is read, or identified, by the interrogator by means of a detuning or loading circuit coupled to the responder through a switch means. The switch means is activated in response to the stored data so as to load the responder resonant circuit, thereby decreasing its interaction with the interrogator resonant circuit. Consequently, the varying loading effect of the responder on the interrogator resonator circuit may be interpreted in terms of the responder data. For example, a signal corresponding to the responder data may be transmitted to the interrogator by amplitude- or phase-modulating the resonant frequency signal of the interrogator.

Whilst Vinding discloses a system in which a responder, self-powered by means of a signal transmitted by an interrogator, transmits data to the interrogator, there is no provision for writing data from the interrogator to the responder.

U.S. Pat. No. 4,845,347 (McCrindle et al) discloses a transaction system permitting bi-directional communication between a portable token and a terminal. Both the terminal and the token include resonant circuits tuned to the same frequency and the token is self-powered by the energy transmitted by the terminal resonant circuit and received by the token resonant circuit by mutual coupling.

Data is transmitted from the token to the terminal by loading the token resonant circuit, thereby modifying its impedance and amplitude modulating the carrier frequency radiated by the terminal resonant circuit.

Data is transmitted from the terminal to the token by frequency modulating the carrier signal generated by the terminal resonant circuit. In particular, the two logic levels HIGH and LOW are transmitted from the terminal to the token by means of two different frequency signals. The token operates on one of two different resonant curves according to which of the two logic levels is received.

Thus, whilst McCrindle et al disclose a system for bi-directional communication between a fixed terminal and a portable token, resonant circuits must be provided in both the terminal and the token and data is transmitted from the terminal to the token by frequency modulation of the terminal resonant circuit carrier signal.

In U.S. Pat. No. 4,814,595 (Gilboa) there is disclosed a data transmission system for the non-contact transmission of data between a station and a portable data card, both of which contain resonant circuits tuned to the same frequency. The data card receives power from the station via inductive coupling of the two resonant circuits and transmits data to the station by means of a loading circuit on the card which loads the card resonant circuit and hence, by mutual coupling, the station resonant circuit in response to data stored within the card. The card also contains a reading circuit containing a pulse generation circuit which generates a pulse whenever the power received by the card resonant circuit is interrupted and then restored. Data may thus be transmitted from the station to the card by deactuating the station resonant circuit in response to the data to be transmitted, the resulting pulses generated within the card being interpreted as the transmitting data.

The pulse generation circuit employed by Gilboa is based on a JK flip-flop which changes state in response to an incoming clock pulse. According to the communications protocol employed by Gilboa, a clock pulse is produced by the card reading circuit whenever the station resonant circuit (and consequently the card resonant circuit also) is deactuated and subsequently re-energized. In such a communications protocol, each pulse generated by the card reading circuit may contain a plurality of logic "0" or "1" bits, the number of such bits corresponding to the time interval between deactuation of the station resonant circuit and its subsequent re-energization.

It is therefore necessary in the card reading circuit to sample the pulse train generated by the pulse generation circuit at very precise time intervals in order to reproduce the correct number of logic pulses between successive deactuations and subsequent re-energizations of the station resonant circuit. This requires the provision of a very precise timing circuit driven by a quartz crystal which is expensive and vulnerable to damage, particularly if the portable card is dropped or otherwise manhandled.

It will be appreciated that the prior art systems either require resonant circuits in both the station and the card for providing a resonant carrier signal which can be modulated with a data signal or, alternatively, require transformer coupling for two-directional data transfer.

However, an inherent problem associated with the use of a resonant circuit in the station is that, in order to operate at resonant frequency, the resonant circuit components, including the antenna and any cable connected thereto, have to be carefully calibrated. In practice, this requires that once the station resonant circuit has been assembled and tuned, the maximum displacement of the antenna relative to the station is fixed and cannot be altered without returning the resonant circuit. This is not always desirable for several reasons. First, the station may represent a secure data system, such as a bank and it may be desirable to locate the antenna a significant distance from the station itself. This is impractical in prior art systems because the capacitance of the connecting cable will be so large as to throw the resonant circuit out of resonance.

It should also be observed that in the prior art systems described above employing resonant circuits, data is generally transmitted from the card to the station by loading the card resonant circuit. This reduces the response of the card resonant circuit and, by mutual coupling, imposes a similar loading on the station resonant circuit and a consequent reduction in response thereof. When there is a significant amount of noise in such systems, the noise can swamp the reduced signal response. It is therefore preferable to detect transmitted data as a result of increased response rather than reduced response in order that the data signal can still be detected even in the presence of noise.

Conventional data transmission protocols for transmitting data from the card to the station in prior art systems include the Manchester code wherein a change in logic level from logic HIGH for a duration of T to logic LOW for a duration of T is interpreted as logic 0, whilst a change in logic level from logic LOW for a duration of T to logic HIGH for a duration of T is interpreted as logic 1. Thus, each pulse transmitted in the Manchester code occupies a time interval of 2T.

The protocol employed by Gilboa for transmitting data from the card to the station is illustrated in FIGS. 6a and 6b of the above-mentioned U.S. Pat. No. 4,814,595. A logic "0" is interpreted as a change in logic level from logic LOW for a time duration of 2T to logic HIGH for a time duration of T, whilst logic "1" is interpreted as a change in state from logic LOW for a time duration of T to logic HIGH for a time duration of 2T. Thus, in such a protocol each data bit occupies a time interval of 3T.

It would be desirable to employ a communications protocol wherein each logic bit occupies, on average, a time interval at least less than 2T as required by the Manchester code.

SUMMARY OF THE INVENTION

It is a principal object of the invention to provide a system for the non-contact transmission of data between a station and a portable data carrier which overcomes some or all of the disadvantages associated with hitherto proposed systems.

According to one aspect of the invention there is provided a system for non-contact transmission of data between a station and a portable data carrier, wherein the station includes:

a station transmitter operating at predetermined frequency for generating a first signal, a matched station antenna coupled via a length of cable to the station transmitter so as to be operative at said frequency regardless of the length of cable, and a receiver for receiving a second signal superimposed on the first signal;

and wherein the portable data carrier includes:

supply means for coupling to a source of electric power, a tuned antenna circuit inductively coupled with the station antenna so as to receive therefrom an induced signal, and a data carrier modulator for modulating the first signal with the second signal in response to first data generated by the data carrier and, by means of said inductive coupling, enabling the first data to be transmitted from the data carrier to the station.

The matched station antenna comprises an antenna and a matching network that matches the antenna impedance to the cable characteristic impedance $Z_O$. This enables the system to operate at various lengths of cable without the need for returning. This is in contrast to hitherto proposed systems including a resonant antenna circuit, wherein the cable acts as a part of the resonant circuit thereby limiting the maximum length of cable permissible and requiring returning whenever the cable length is changed.

The station transmitter transmits a carrier wave via the matched antenna. The carrier wave is also used to radiate power to the data carrier tuned antenna circuit and is preferably amplitude modulated by a second signal derived from the data carrier tuned antenna circuit. The modulated signal fed to the receiver within the station which recovers the first data transmitted by the data carrier.

The station preferably includes a control circuit having means for deactuating the station transmitter thereby changing the voltage induced within the data carrier tuned antenna circuit. The data carrier includes a detector which detects the state of the voltage induced within the data carrier tuned antenna circuit. By this means, the state of the data carrier tuned antenna circuit can be modified in accordance with data generated by the station control circuit.

Whenever the data carrier is within the vicinity of the station antenna, a voltage is induced within the tuned antenna circuit by means of mutual coupling. Preferably, the data carrier circuit contains a microprocessor and a non-volatile memory which are energized by the voltage induced in the tuned antenna circuit and the modulator includes a decoupling means controlled by the microprocessor so as effectively to prevent the tuned antenna circuit from supplying energy to the remaining data carrier circuitry, in response to data generated by microprocessor. This unloads the tuned antenna circuit and modulates the first signal by increasing its amplitude. Modulation by means of decoupling results in a significant increase of the modulation depth compared to modulation by means of loading proposed in prior art systems.

When data is transmitted by the station to the data carrier, the output of the detector is fed to the microprocessor within the data carrier so as to recover the data and store it in the non-volatile memory. The data transmitted by the data carrier to the station may either be stored within the non-volatile memory or may be derived via any source internal or external to the data carrier.

BRIEF DESCRIPTION OF THE DRAWINGS

For a cleaner understanding of the invention and to understand how the same may be carried out in practice, some preferred embodiments will now be described, by way on non-limiting example only, with reference to the accompanying drawings, in which.

DESCRIPTION OF PREFERRED EMBODIMENTS

Figure 1:
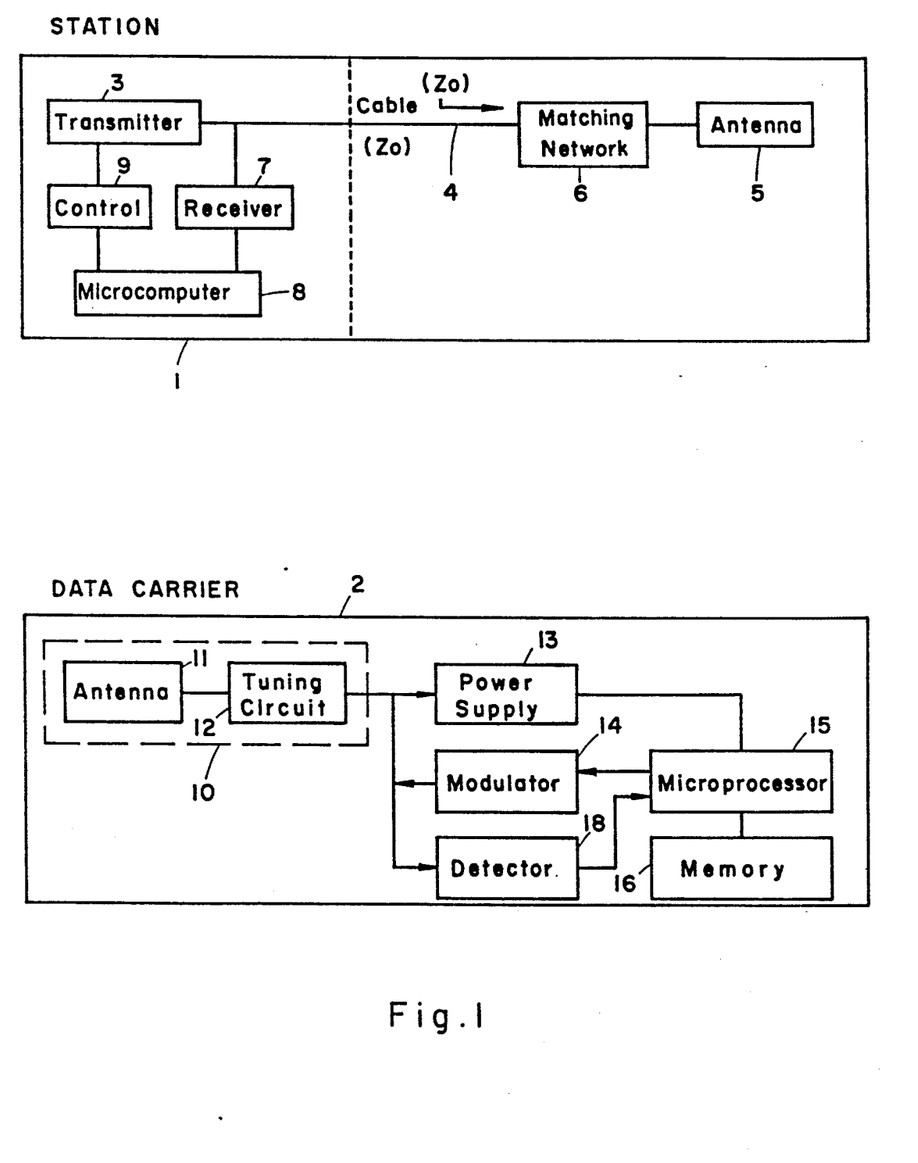
FIG. 1 is a block diagram showing schematically the system comprising a fixed station and a portable data carrier.

As seen in FIG. 1 the system comprises a fixed station 1 and a portable data carrier 2. The fixed station 1 comprises an rf transmitter 3 which transmits a radio frequency signal which is fed through a coaxial cable 4 to an antenna 5 via a matching circuit 6. The output from the transmitter 3 is also fed to a receiver 7 and thence to a first microcomputer 8. The microcomputer 8 is coupled to the transmitter 3 via a control unit 9 by means of which the transmitter 3 may be deactuated in response to data generated by the microcomputer 8 so that no signal reaches the antenna 5. The microcomputer 8 together with the control circuit 9 constitute a station control circuit.

The portable data carrier 2 comprises a tuned antenna circuit 10 including an antenna 11 and a tuning circuit 12. The antenna 11 is tuned to the same frequency as the station transmitter 3 by means of the tuning circuit 12 whose output is fed to a power supply 13 which provides power for the rest of the circuit. The tuning circuit 12 is also coupled to a modulator 14 controlled by a microprocessor 15 powered by the power supply 13 and having associated therewith a memory 16. A detector 18 is coupled to the tuning circuit 12 and is responsive to an output voltage thereof for inputting data to the microprocessor 15.

The operation of the station 1 is as follows. The transmitter 3 generates an rf signal (constituting a first signal) which is fed to the matched antenna 5 via the cable 4. The matching network 6 matches the impedance of the antenna 5 to the characteristic impedance $Z_O$ of the cable 4, as will be explained in greater detail below with reference to FIG. 2 of the drawings.

The first signal is amplitude modulated by a second signal generated within the data carrier 2 in response to first data therein and fed to the receiver 7 wherein the second signal is detected and amplified. The resultant signal is filtered so as to remove the rf component from the detected signal so that the first data may be recovered and stored by the microcomputer 8.

The microcomputer 8 provides means for deactuating the transmitter 3 whereby the first signal generated by the transmitter 3 may effectively be modulated by second data generated within the station 1 by the microcomputer 8.

The operation of the portable data carrier 2 is as follows. The antenna 11 is tuned to the same frequency as that generated by the transmitter 3 in the fixed station 1. Consequently, when the data carrier 2 is brought within the vicinity of the station 1 a voltage is induced within the tuned antenna circuit 10 by means of mutual coupling. The power supply 13 draws its energy from the voltage induced in the tuned antenna circuit 10 and includes additional circuitry for rectifying, limiting and smoothing the induced voltage so as to produce a stable dc voltage suitable for powering the circuitry associated with the data carrier 2.

The modulator 14 modulates the first signal with the second signal by decoupling the tuning circuit 12 from the power supply 13. The modulator 14 is controlled by the microprocessor 15 in response to the first data generated thereby. The detector 18 senses the level of the voltage induced in the tuned antenna circuit 10 and produces an equivalent digital signal which is fed to the microprocessor 15. The microprocessor 15 interprets the logic level of the digital signal produced by the detector 18 so as to recover the second data transmitted by the station 1.

The memory 16 is non-volatile and ensures that the data stored within the data carrier 2 remains intact even when the power supply 13 is disabled.

Figure 2:
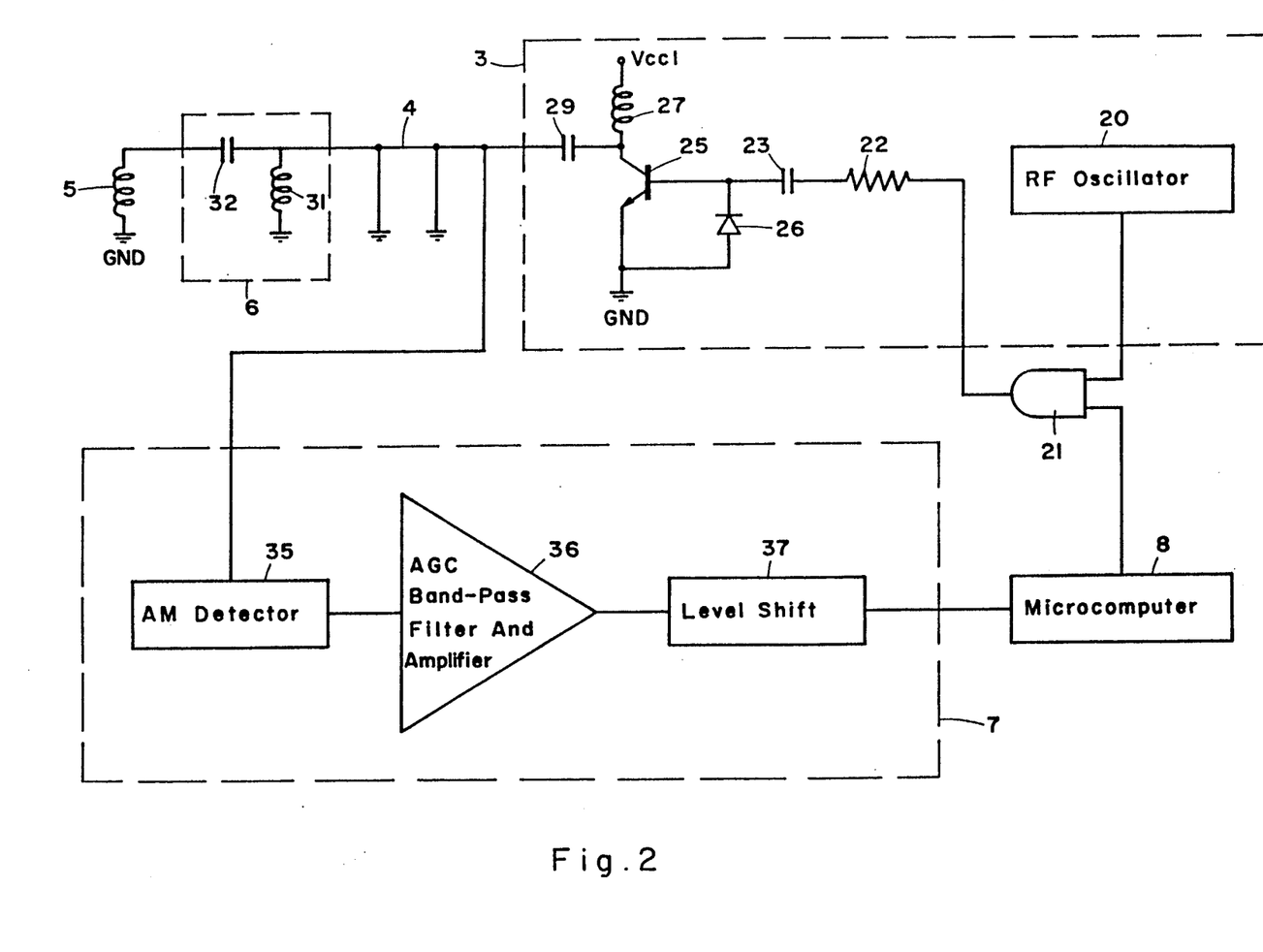
FIG. 2 is a partial circuit diagram of the station.

Reference will now be made to FIG. 2, which shows in more detail some of the station circuitry represented functionally in FIG. 1. The transmitter 3 comprises an rf oscillator 20 having therein a quartz crystal which generates an rf signal of characteristic frequency. The output from the rf oscillator 20 is connected to one input of a 2-input AND gate 21 whose other input is connected to the microprocessor 15. The output of the AND gate 21 is fed via a resistor 22 connected in series with a capacitor 23 to the base of a bipolar junction transistor 25 whose emitter is connected to ground GND. The resistor 22 and the capacitor 23 together constitute an impedance whose value is chosen to match the logic levels of the rf digital signal to the input analog voltage levels of the transistor 25. A diode 26 is connected with its anode to GND and its cathode to the base of the transistor 25 and serves to discharge the capacitor 23 when the transistor 25 is cutoff. The collector of the transistor 25 is connected to one end of an rf choke 27 whose other end is connected to a positive supply rail Vcc1.

The collector of the transistor 25 is coupled, via a capacitor 29, to one end of the cable 4 whose other end is connected to the antenna 5 by the matching circuit 6. The matching circuit 6 includes a parallel inductance 31 connected between the cable 4 and ground GND and a series capacitance 32 connected between the cable 4 and the antenna 5. The antenna 5 comprises a wound coil having associated therewith an ohmic resistance and a parasitic capacitance. The matching network 6 matches the impedance of the antenna 5 to the characteristic impedance $Z_O$ of the cable 4. This ensures that the impedance of the antenna 5 in combination with the matching circuit 6 is equal to $Z_O$. The calculation of the component values of the inductance 31 and the capacitance 32 is straightforward once the above requirement is understood, but for the sake of completeness the basic equation is as follows:

$$Z_O = \frac{Z_L(Z_A + Z_C)}{Z_A + Z_C + Z_L} \quad (1)$$

where:
$Z_L$ is the impedance of the inductance 31;
$Z_C$ is the impedance of the capacitance 32;
$Z_A$ is the impedance of the antenna 5; and
$Z_O$ is the characteristic impedance of the cable 4.

It will be understood, however, that the matching circuit 6 shown in FIG. 2 is only one of several possible configurations and that different components can be employed in various series or parallel connections so as to achieve the desired matching between the cable 4 and the antenna 5.

The junction between the capacitor 29 and the cable 4 is fed to an AM detector 35 whose output is fed to the input of an AGC band-pass filter and amplifier 36 whose output is fed to the microprocessor 15 via a level shift circuit 37. The output from the AM detector 35 corresponds to the first data generated by the data carrier 2 whose rf frequency component corresponding to the signal generated by the rf transmitter 3 is removed by the band-pass filter. The AGC provides a constant amplitude signal at the input of the level shift circuit 37 which serves as a buffer and shifts the signal levels to logic levels suitable for the microprocessor 15. The AM detector 35, the AGC band-pass filter and amplifier 36 and the level shift circuit 37 together constitute the receiver 7 shown in FIG. 1.

The signal generated by the rf oscillator 20 is a digital rf signal which is amplified by the transistor 25 only when the 2-input AND gate 21 is enabled by the microcomputer 8. Thus, when the microcomputer 8 applies a zero logic level control signal to the second input of the AND gate 21, the rf oscillator 20 is decoupled from the transistor 25, thereby effectively deactuating the transmitter 3.

Figure 3:
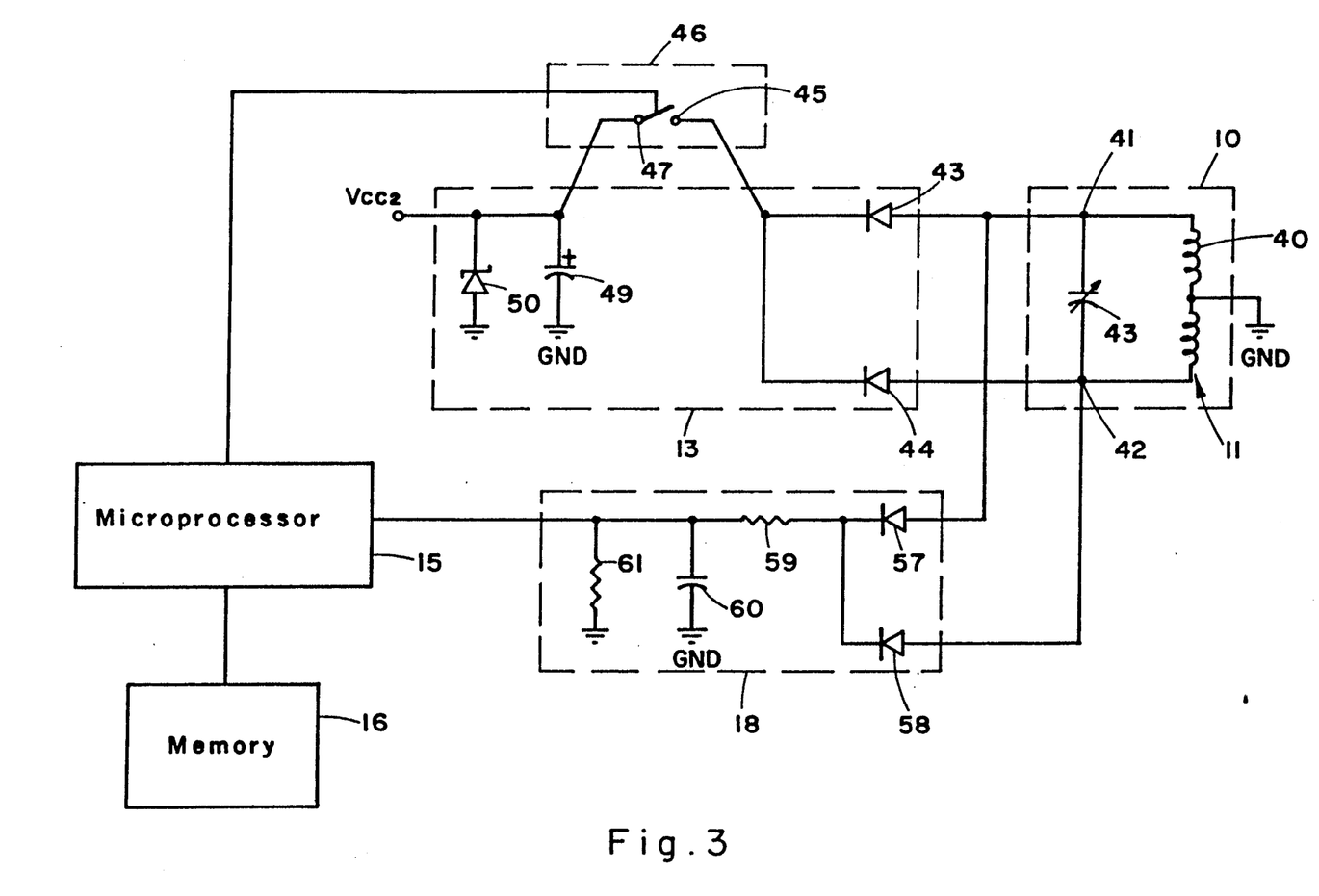
FIG. 3 is a partial circuit diagram of the data carrier.

Referring now to FIG. 3 of the drawings, some of the circuitry relating to the data carrier 2 and shown functionally in FIG. 1 will now be described.

The antenna 11 comprises a center-tapped coil 40 whose center tap is connected to ground GND and whose ends are connected to terminals 41 and 42, across which is connected a tuning capacitor 43. The terminals 41 and 42 are respectively connected to the anodes of rectifier diodes 43 and 44, whose cathodes are commonly connected to a first contact 45 of a normally-closed electronically operated switch 46. The other switch contact 47 is connected to the positive DC supply rail Vcc2 such that when the switch 46 is open, the positive supply rail Vcc2 is disconnected from the tuned antenna circuit 10. The DC voltage at the positive supply rail Vcc2 is smoothed by means of a smoothing capacitor 49 connected between the positive supply rail Vcc2 and GND and clipped by a zener diode 50 which limits the maximum DC voltage to a safe level.

The tuning capacitor 43 constitutes the tuning circuit 12 and the switch 46 constitutes the modulator 14 shown functionally in FIG. 1. Likewise, the combination of the diodes 43 and 44, together with the smoothing capacitor 49 and the zener diode 50 constitute the power supply 13 shown functionally in FIG. 1.

The tuned antenna circuit 10 is constituted by the center-tapped coil 40 together with the tuning capacitor 43 and its output is coupled at terminals 41 and 42 to respective anodes of rectifier diodes 57 and 58. The cathodes of the rectifier diodes 57 and 58 are commonly connected, via a current limiting resistor 59, to a timing circuit comprising a parallel connection of a capacitor 60 and a resistor 61 connected between the resistor 59 and GND. The combination of the diodes 57 and 58, together with the resistor 59, the capacitor 60 and the resistor 61, constitutes the detector 18 shown functionally in FIG. 1.

It has already been explained that the data carrier 2 is not self-powered but, rather, is powered by the voltage signal induced in the tuned antenna circuit 10 in response to the signal transmitted by the station 1. The manner in which this is achieved is as follows. The tuned antenna 11 within the data carrier 2 resonates when it is brought within a predetermined distance of the station antenna 5, since the antenna 11 is tuned by the tuning capacitor 43 to substantially the same frequency of the rf signal transmitted by the station transmitter 3. The data carrier 2 starts to operate whenever the magnitude of the signal thus induced within the tuned antenna circuit 10 is sufficiently high to enable the microprocessor 15 to function.

The maximum operating distance in which the data carrier 2 is sensitive to the signal transmitted by the station transmitter 3 depends on several factors including, for example, the size and shape of the station antenna 5 and the data carrier antenna 11. Other factors include the magnitude of the signal generated by the station transmitter 3 and the power consumption of the data carrier circuitry. The mutual coupling between the station antenna 5 and the data carrier antenna 11 is also influenced by the mutual spatial orientation of the two antennas, as well as the presence of high permeability materials within the magnetic circuit linking the two antennas.

The microprocessor 15 is responsive to the data stored within the memory 16 for opening and closing the switch 46, whereby the DC positive supply rail Vcc2 is decoupled from the tuned antenna circuit 10. During the time that the positive supply rail Vcc2 is decoupled, the smoothing capacitor 49 supplies electric power to the remaining data carrier circuitry.

Figure 4:
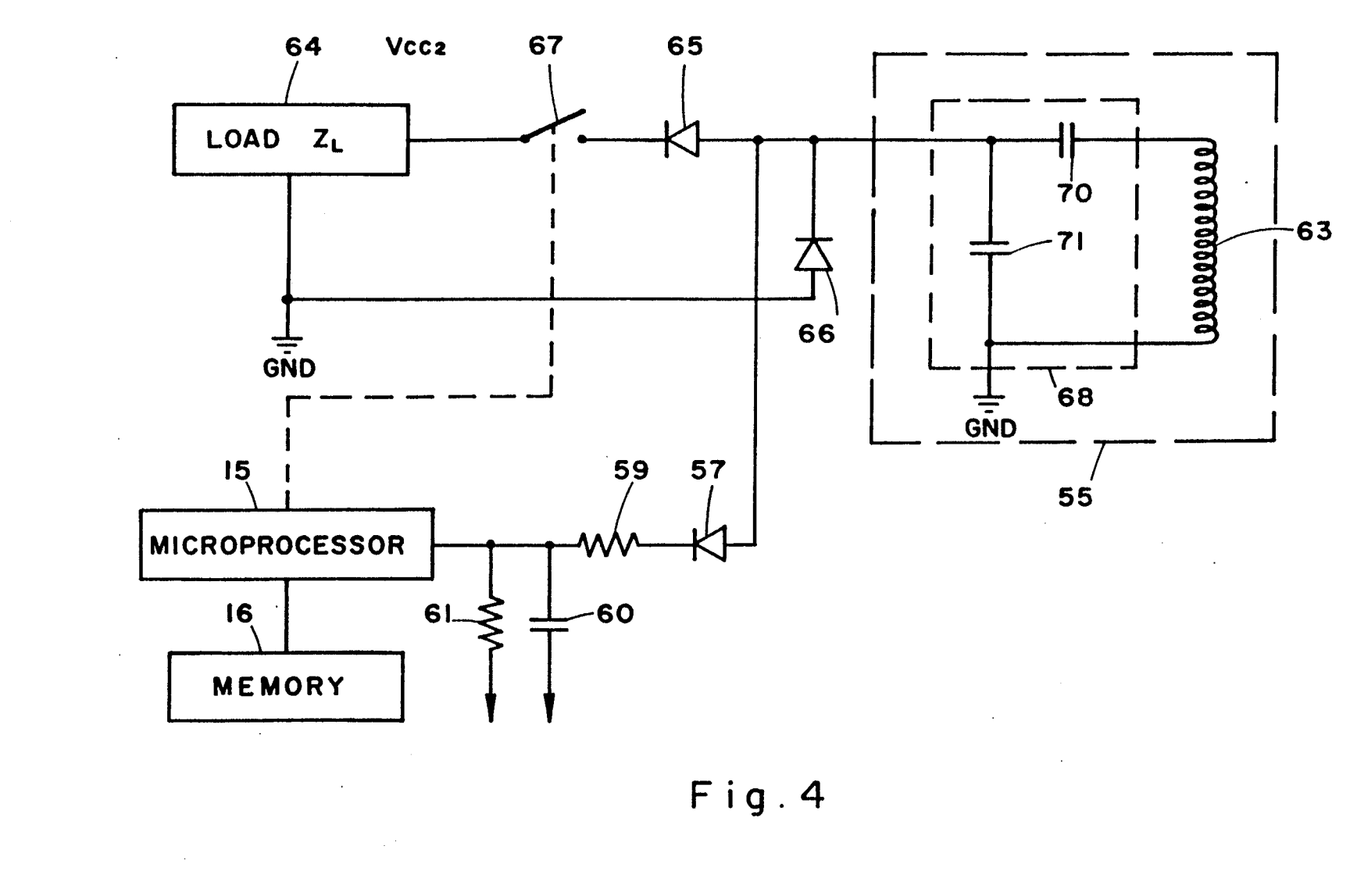
FIG. 4 is a detail of an alternative tuned antenna circuit for the data carrier circuitry shown in FIG. 3.

The tuned antenna circuit 10 shown in FIG. 3 is a resonant circuit whose resonant frequency is substantially equal to the frequency of the station transmitter 3. FIG. 4 shows a detail of an alternative tuned antenna circuit employing a matched antenna circuit instead of a resonant circuit. In FIG. 4 those components which are common to the embodiment described above with reference to FIG. 3 are given identical reference numerals.

Thus there is shown in FIG. 4 a tuned antenna circuit 55 comprising a coil antenna 63 operating at the frequency of the transmitter 3 (shown in FIG. 2) so as to receive an induced voltage therein by mutual coupling. The induced voltage supplies a load 64 having a load impedance $Z_L$ by means of a full wave rectifier comprising rectifier diodes 65 and 66. The cathode of the rectifier diode 65 is coupled to the load 64 via a switch 67 operated under control of the microprocessor 15.

The antenna 63 is matched to the load 64 by means of a matching circuit 68 comprising a capacitor 70 connected in series with the antenna 63, and a capacitor 71 connected in parallel the resulting series combination. The capacitances of the capacitors 70 and 71 are selected such that the resulting impedance of the antenna 63 together with the matching circuit 68 is equal to the load impedance $Z_L$.

The operation of the circuit is essentially the same as that described above with reference to FIG. 3 of the drawings. The microprocessor 15 is responsive to data stored in the memory 16 for opening the switch 67, whereby the load 64 is decoupled from the tuned antenna circuit 55.

Figure 5:
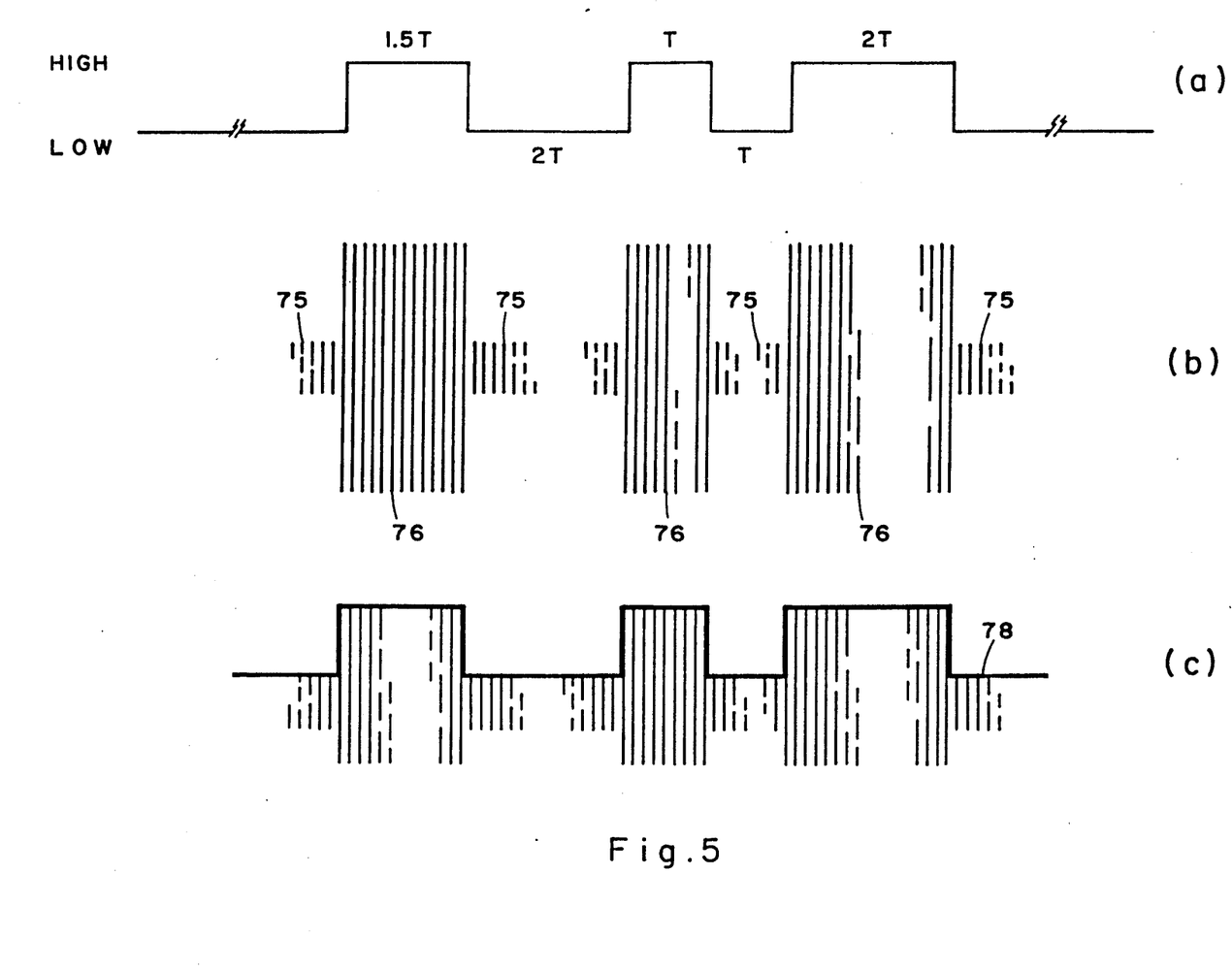
FIGS. 5a to 5c are pictorial representations of the control signal, induced signal and data waveforms associated with the data carrier when transmitting from the data carrier to the station in accordance with a first communications protocol.
Figure 6:
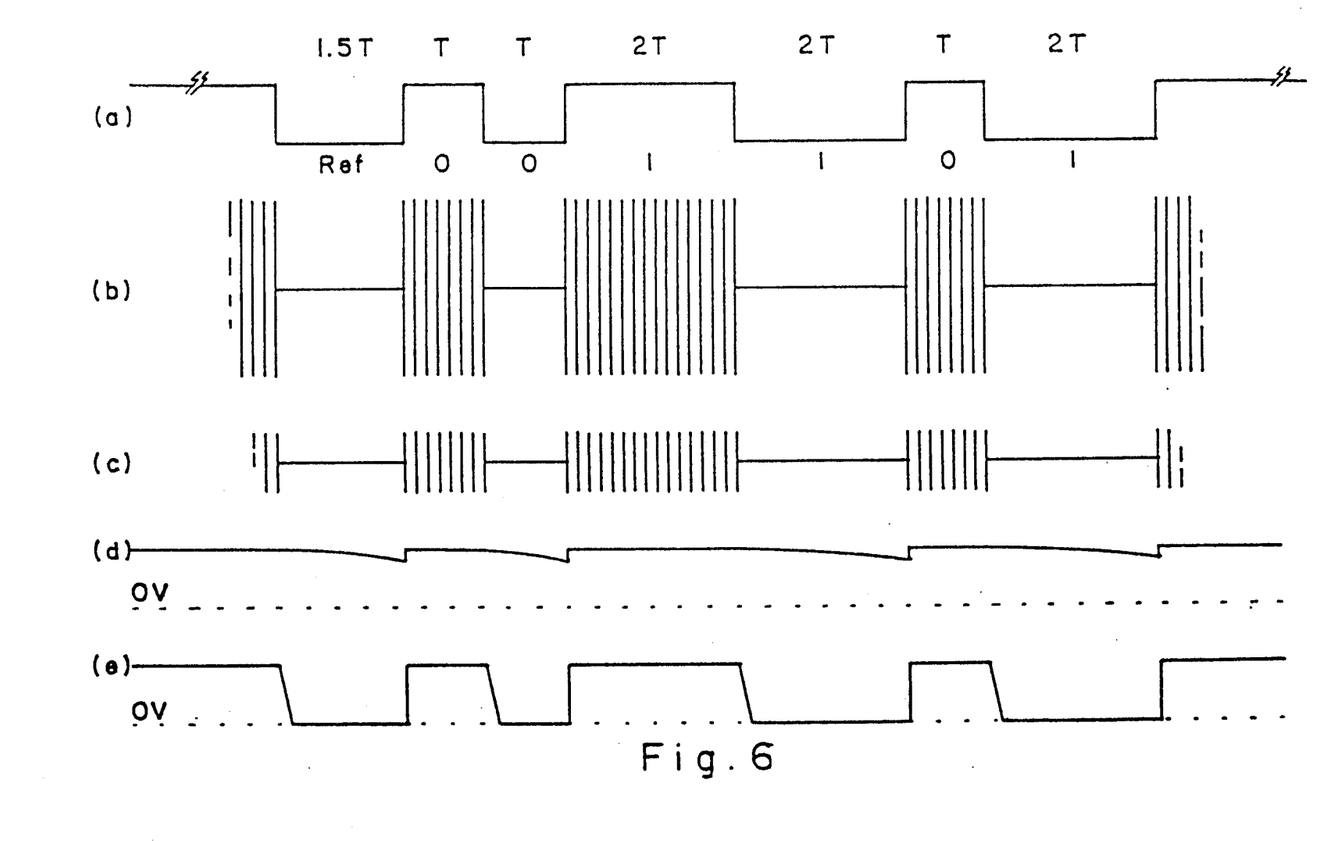
FIGS. 6a to 6e are pictorial representations of the carrier signal and data waveforms associated with the station and data carrier when transmitting from the station to the data carrier using the first communications protocol.
Figure 7:
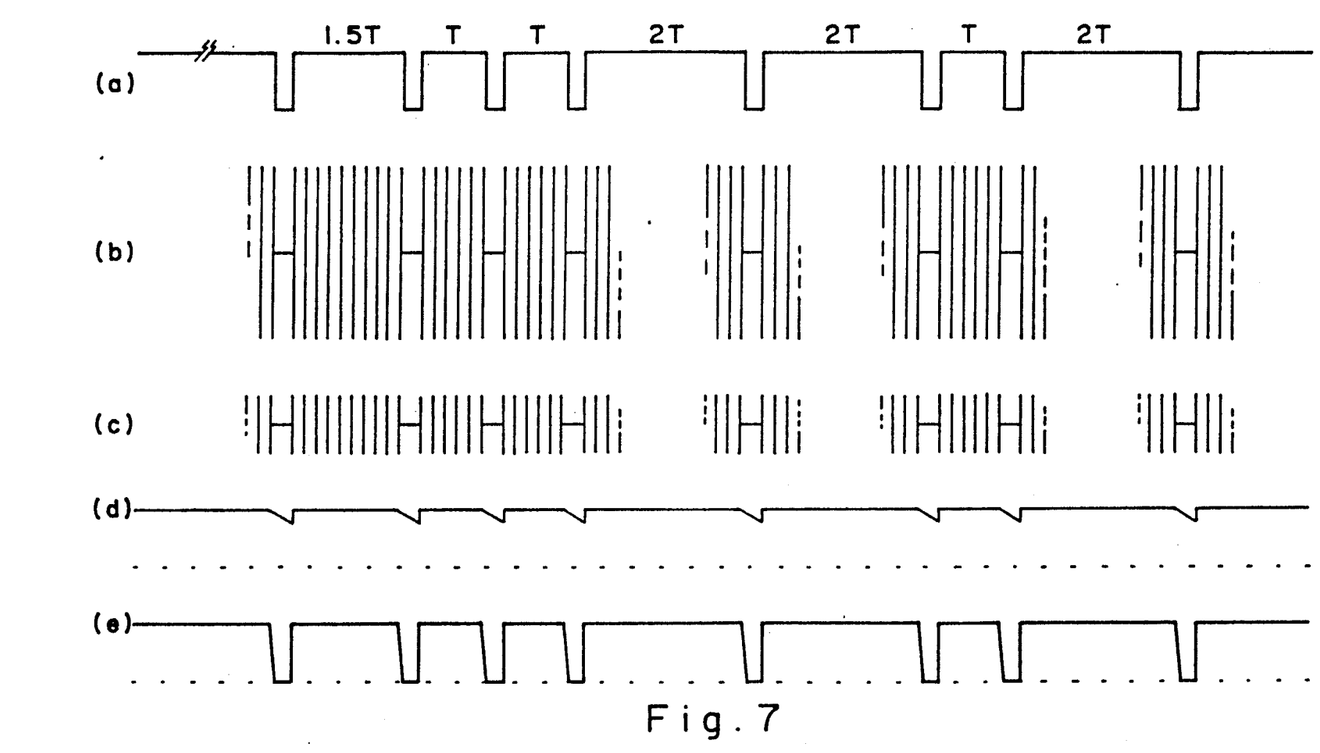
FIGS. 7a to 7e are pictorial representations relating to an alternative communications protocol for data transaction from the station to the data carrier.

Referring now to FIG. 5 of the drawings, the effect of decoupling the tuned antenna circuit 55 from the positive supply rail Vcc2 (and the load connected thereto) will be explained in more detail with reference to the transmission from the data carrier 2 to the station 1 of data corresponding to 1001 (binary).

FIG. 5a shows the form of a control signal pulse train which must be generated by the microprocessor 15 within the data carrier 2. The control signal has two logic levels LOW, corresponding to the switch 46 being closed, and HIGH corresponding to the switch 46 being open. At the beginning of the pulse train, a reference pulse is generated by the microprocessor 15 having a pulse width of 1½ T for opening the switch 46 for an equal time period. The first data bit corresponding to logic "1" requires a control bit having a pulse width of 2 T which closes the switch 46 for an equivalent time period. The next two data bits corresponding to logic "0" require respective control pulse widths of T which successively open and close the switch 46 for equal time periods of T. The final data bit corresponding to logic "1" requires that the switch 46 again be opened for a time period of 2 T by generating a control bit of pulse width equal to 2 T, after which the control pulse train returns to logic level LOW whereby the switch 46 is again closed.

Referring to FIG. 5b of the drawings, there will now be described the effect on the induced signal within the data carrier 2 of opening and closing the switch 46 in response to the control pulse train shown in FIG. 5a. The sections of the waveform marked 75, having a relatively low amplitude, correspond to the situation wherein the switch 46 is closed. When the switch 46 is open, the tuned antenna circuit 10 is decoupled from the power supply 13, and this effectively unloads the resonant circuit comprising the center-tapped coil 40 and the tuning capacitor 43. Under these conditions, the magnitude of the signal induced within the tuned antenna circuit 10 increases as shown by those sections of the curve marked 76.

FIG. 5c shows the effect on the first signal generated by the station transmitter 3 of decoupling and coupling the tuned antenna circuit 10 within the data carrier 2. It will be seen that the form of the first signal is similar in shape to the induced signal shown in FIG. 5b, and an envelope 78 of the first signal corresponds exactly to the control pulse train shown in FIG. 5b, thereby enabling the station 1 to recover the transmitted data.

It should be noted that the sections 75 and 76 of the waveform in FIG. 5b are not drawn to scale. In practice, the amplitude of the induced signal when the tuned antenna circuit 10 is unloaded (i.e. switches 46 or 67 are open), can be several times greater than when the tuned antenna circuit 10 is loaded and the effect on the first signal is significantly greater than the effect achieved by loading the antenna as taught in hitherto proposed systems.

Referring now to FIGS. 6a to 6e of the drawings, there will be described a protocol according to which data is communicated between the station 1 and the data carrier 2. The data to be transmitted is organized into words, each of which starts with a reference bit having a predetermined time period and is followed by a plurality of bits corresponding to the actual data, and each having a respective time period corresponding to the logic level associated therewith. Thus, the pulse width for logic "0" is equal to T, whilst the pulse width for logic "1" is equal to 2 T.

FIG. 6a shows the form of a control signal pulse train, applied to the AND gate 21 by the microcomputer 8 (see FIG. 2) for transmitting the data word 001101 (binary) from the station 1 to the data carrier 2.

At the beginning of the pulse train, a reference pulse having a pulse width of 1½T is transmitted. The next two data bits, corresponding to logic "0" are transmitted, each having a pulse width of T, whilst the next two data bits, corresponding to logic "1" are transmitted, each having a pulse width of 2T. The next two data bits, corresponding to logic "0" and logic "1", respectively, are transmitted having pulse widths of T and 2T, respectively. The pulse train shown in FIG. 6a is decoded by the microprocessor 15 within the data carrier 2 simply by comparing the width of the reference pulse with the respective widths of each subsequent data pulse.

If the width of the data pulses is less than the width of the reference pulse, this corresponds to logic "0", whilst if the opposite is true and the width of the data pulse exceeds the width of the reference pulse, this corresponds to logic "1".

When it is desired to transmit data from the microcomputer 8 within the station 1 to the data carrier 2, a control signal supplied by the microcomputer 8 to the AND gate 21, switches the transmitter 3 off and on as seen in FIG. 6b which shows the resulting signal generated thereby. FIG. 6c shows the form of the voltage induced within the tuned antenna circuit 10 in the data carrier 2, from which it will be seen that the induced voltage falls to zero whenever the station transmitter 3 is deactuated under control of the microcomputer 8.

FIG. 6d shows the DC level of the positive supply rail Vcc2 corresponding to the deactuation and subsequent re-energization of the station transmitter 3. It will be noted that the smoothing capacitor 49 (see FIG. 3) is sufficiently large that there is only slight discharge of the smoothing capacitor 49 during those periods when the station transmitter 3 is deactuated, thereby ensuring an uninterrupted supply of power to the data carrier 2.

FIG. 6e represents the output of the detector 18 shown in FIG. 3, from which it will be seen that the output of the detector 18 follows the envelope of the voltage induced within the tuned antenna circuit 10 of the data carrier 2 shown in FIG. 6c. The discharge RC time constant, determined by the values of the capacitor 60 and the resistor 61, is short compared to the minimum pulse period T. The recharge RC time constant of the capacitor 60 is determined mainly by the value of the resistor 59 and is substantially instantaneous.

It will be understood that if, on average, the number of logic "0" bits equals the number of logic "1" bits, then the average data pulse width is equal to 1½T, which results in faster data transmission than that achieved with the well-known Manchester code, whose constant pulse width is equal to 2T.

More importantly, such a protocol obviates the need for very precise time reference within the data carrier 2, since it enables reliable communication between a receiver and a transmitter having unrelated and different time bases, thereby rendering the resultant crystal free data carrier 2 both less expensive and more robust.

In the communications protocol described above with reference to FIGS. 6a to 6e of the drawings, the reference bit and the data bits are defined as the time period between successive logic changes. Thus, in FIG. 6a, the reference pulse commences when the logic level changes from HIGH to LOW, whilst the first data bit commences when the logic level changes state from LOW to HIGH, and so on.

Referring to FIGS. 7a to 7e of the drawings, there will now be described an alternative communications protocol for transmitting data from the station 1 to the data carrier 2, and wherein the reference bit and each of the data bits are defined as the time period between successive pulses.

FIG. 7a shows the control signal developed by the microcomputer 8 within the station 1. It will be seen that the logic level of the control signal is normally HIGH except when a short pulse is generated by the microcomputer 8 when the logic level goes LOW for the time duration of the pulse. The first two pulses in the control pulse train are spaced apart in time by a period of 1½T and define a HIGH logic level reference bit having a time period equal to 1½T whilst the remaining pulses in the control pulse train show the control pulses which must be generated by the microcomputer 8 in order to transmit the data word 001101 (binary). The first two bits of data corresponding to logic "0" are represented by data pulses having respective time periods both equal to T thereby requiring that short pulses be transmitted at the end of successive time intervals, each equal to T. The next two bits of the data correspond to logic "1", requiring that the next two control pulses are generated by the microcomputer 8 after further respective time interval equal to 2T. The next data bit corresponds to logic "0", requiring that the next pulse is generated after a further time interval equal to T, whilst the final data bit, corresponding to logic "1", requires that a further pulse is generated after a time interval of 2T.

FIG. 7b shows the resultant voltage generated by the rf oscillator 20 (see FIG. 2), from which it will be seen that a constant amplitude signal is generated except during those brief periods when the microcomputer 8 sends a control pulse for disabling the AND gate 21 shown in FIG. 2. FIG. 7c shows the voltage induced within the tuned antenna circuit 10 of the data carrier 2 and corresponds in shape generally to the waveform shown in FIG. 7b. Unlike the situation shown in FIG. 6c, where a change in voltage output corresponding to the station transmitter 3 being either actuated or deactuated represents the start or end of a logic pulse, in FIG. 7c a signal is continuously induced within the tuned antenna circuit 10 in the data carrier 2 except during the very brief time interval when a control pulse is generated by the microcomputer 8 in the station 1.

FIG. 7d shows the DC voltage level produced by the power supply 13 within the data carrier 2, from which it will be seen that the smoothing capacitor 49 (shown in FIG. 3) discharges only during the brief time intervals when a pulse is generated by the microcomputer 8.

FIG. 7e shows the data signal detected by the detector 18 in the data carrier 2 consequent to the control signal shown in FIG. 7a being generated by the microcomputer 8 within the station 1. This, of course, corresponds to the data signal transmitted by the station microcomputer 8.

Figure 8:
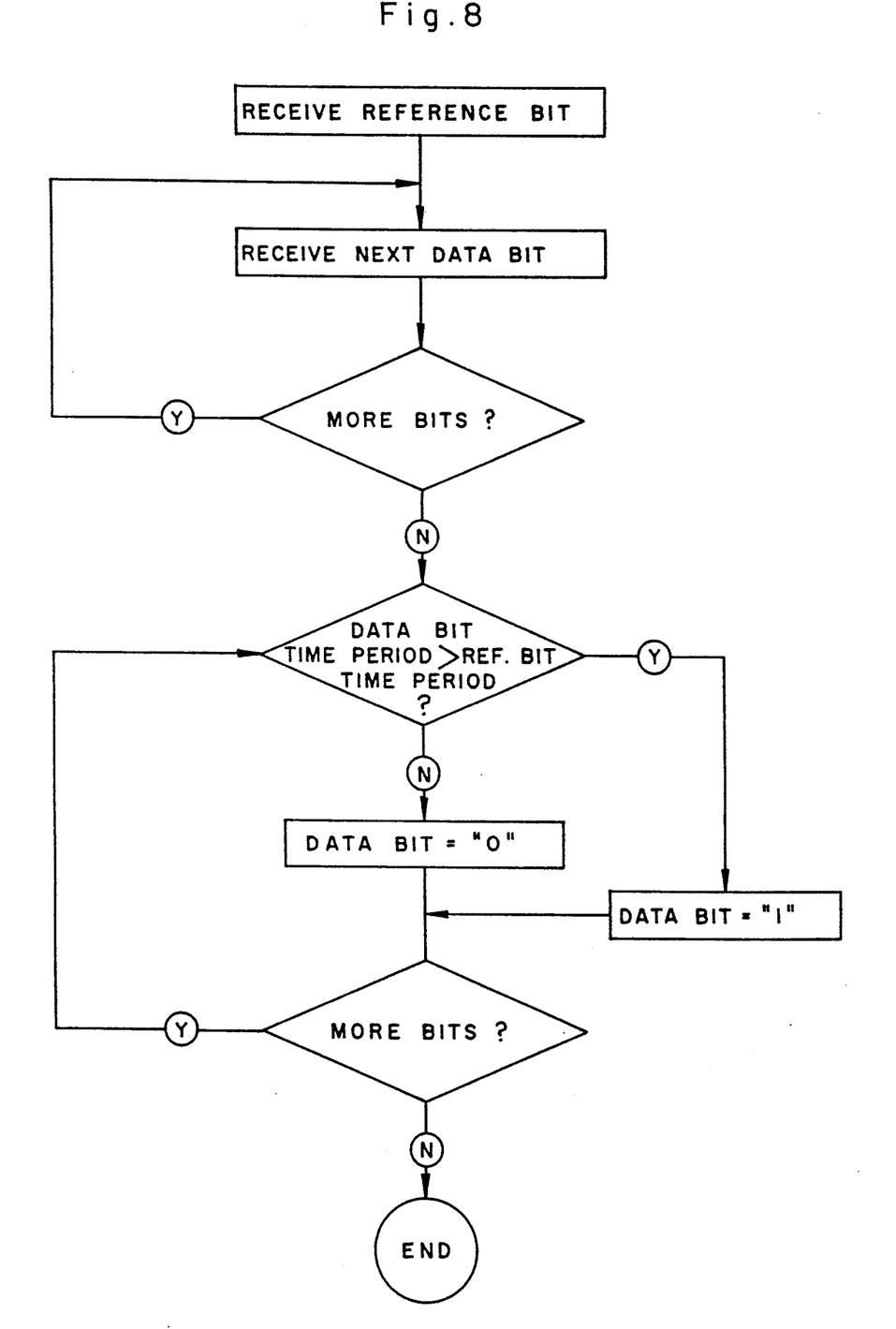
FIG. 8 is a flow diagram showing the principal steps in decoding received data transmitted in accordance with the communications protocols illustrated in FIGS. 6 and 7.

Referring to FIG. 8 of the drawings there will now be summarized the principal steps required for decoding a data signal transmitted according to the communications protocols described above with reference to FIGS. 6 and 7 of the drawings. At the start of the procedure a reference bit is received which is followed by one or more sequences of data bits. The end of each sequence of data bits is signalled by a stop signal. The time periods of the reference bit and each of the data bits are stored in a temporary buffer for subsequent processing.

The stored data is processed by comparing the time period of each data bit with the time period of the reference bit, a data bit being designated logic "0" if its time period is less than that of the reference bit and as logic "1" otherwise. The procedure is repeated in like manner until all the stored data has been processed.

It should be noted that whilst, in the preferred embodiment the portable data carrier is powered by means of energy transmitted from the station, it can equally well be self-powered since the manner in which the data carrier receives power is not itself a feature of the invention. Likewise, it should be understood that whilst the preferred embodiments relate to bi-directional communication between the station and the data carrier, this also is not a characterizing feature of the invention whose principal novel feature resides in the provision of a matching circuit in the station for ensuring that the output impedance seen by the antenna remains constant regardless of the length of cable connecting the antenna to the transmitter within the station.

A subsidiary feature of the invention resides in the communications protocol for transmitting data between the station and the data carrier which results in a faster average transmission rate than is available with hitherto proposed systems.

In the preferred embodiments, the reference bit and the data bits are defined as the time periods between either successive logic changes or between successive pulses. However, the logic changes or pulses need not be successive providing only that the decoder within the receiver employs exactly the same protocol as the transmitter.

It should also be noted that, whilst in the preferred embodiments, the carrier signal received by the data carrier tuned antenna circuit is modulated in response to data generated by the data carrier by decoupling the tuned antenna circuit from the power supply, modulation may also be effected by loading the data carrier tuned antenna circuit as described in any of the prior art references discussed above.

Furthermore, although the preferred embodiments have been described with reference to a portable data carrier, it will be appreciated that the invention may be equally employed within more general data transfer systems.

For example, in a restricted access system, an access code may be pre-stored within the memory of the data carrier so as to permit restricted access to the owner of the data carrier dependent on the particular code stored therein.

A further use for the invention is a manufacturing system in which each workpiece carries a marker corresponding to the data carrier of the invention. The marker identifies the workpiece and also permits a record of each machining operation, for example, to be written to the marker so that it contains an up-to-date record of all operations performed on the workpiece. This permits manufacturing data associated with the workpieces to be processed during manufacture and, since the data transfer is effected without contacting the workpiece, the manufacturing process does not require halting for the transmission of data.

Other uses for the invention include shop inventory control systems where goods carry appropriate tags each storing therein corresponding order codes, storeroom codes, cost and retail prices, and so on. At the checkout counter, a non-contact reader automatically reads and processes the data stored within the tags as the goods pass, so that invoices can be prepared automatically without the need to enter codes manually.

This not only results in a much faster throughput of goods, but also prevents errors resulting from the incorrect manual entry of price codes. Furthermore, storeroom data is automatically updated permitting automatic reordering of goods when the remaining quantity falls below a predetermined threshold.

Other uses for the invention will be apparent to those skilled in the art and include coinless public telephone systems, automatic personnel time card systems and so on.

We claim:

1. A system for non-contact transmission of data between a station and a portable data carrier, wherein the station includes:
   a station transmitter operating at a predetermined frequency for generating a first signal,
   a matched station antenna coupled via a length of cable to the station transmitter and constructed so as to be operative at said predetermined frequency regardless of the length of cable, and
   a receiver for receiving a second signal superimposed on the first signal;
   and wherein the portable data carrier includes:
   supply means for coupling to a source of electric power,
   a tuned antenna circuit inductively coupled with the station antenna so as to receive therefrom an induced signal, and
   a data carrier modulator comprising a decoupling means, said decoupling means decoupling the tuned antenna circuit in the data carrier in response to a first data generated by the data carrier and thereby modulating the first signal with the second signal, and by means of said inductive coupling enabling the first data to be transmitted from the data carrier to the station.

2. The system according to claim 1, wherein the tuned antenna circuit comprises a resonant circuit tuned to the frequency of the first signal.

3. The system according to claim 1, wherein the tuned antenna circuit comprises a matched antenna circuit so as to maximize antenna efficiency.

4. The system according to claim 2, wherein the supply means is coupled to the tuned antenna circuit and is responsive to the induced signal for supplying electric power to the data carrier.

5. The system according to claim 2, wherein the station further includes:
   a station control circuit for deactuating the station transmitter in response to second data stored in the station and, by means of said inductive coupling, deactuating the signal induced in the data carrier tuned antenna circuit;
   and the data carrier further includes a detector coupled to the data carrier tuned antenna circuit for detecting the state of the induced voltage of the data carrier tuned antenna circuit,
   a logic circuit coupled to the detector and responsive to said state, whereby an output of the logic circuit corresponds to the second data, and
   means for coupling the output of the logic circuit to a memory within the data carrier so as to store the second data therein.

6. In the system according to claim 2, a method for transmitting data from the data carrier to the station, comprising the steps of:
   transmitting a logic reference bit having a predetermined time period,
   transmitting a plurality of bits corresponding to said data and having respective time periods,
   comparing, for each of said plurality of bits, the respective time period with the predetermined time period of the logic reference bit and assigning a respective logic level according to whether the respective time period is greater than or less than the predetermined time period.

7. In the system according to claim 5, a method for transmitting data from the station to the data carrier, comprising the steps of:
   transmitting a logic reference bit having a predetermined time period,
   transmitting a plurality of bits corresponding to said data and having respective time periods,
   comparing, for each of said plurality of bits, the respective time period with the predetermined time period of the logic reference bit and assigning a respective logic level according to whether the respective time period is greater than or less than the predetermined time period.

8. The method according to claim 6, wherein the reference bit or each of the plurality of bits are defined as the time period between pulses.

9. The method according to claim 6, wherein the reference bit or each of the plurality of bits are defined as the time period between logic changes.

10. The method according to claim 7, wherein the reference bit or each of the plurality of bits are defined as the time period between pulses.

11. The method according to claim 7, wherein the reference bit or each of the plurality of bits are defined as the time period between logic changes.

12. A data carrier for transmitting data to a remote receiver tuned to a predetermined frequency, the data carrier comprising:
   supply means for coupling to a source of electric power,
   a tuned antenna circuit inductively coupled to a station of the remote receiver antenna for receiving therefrom a first signal having said predetermined frequency and transmitting said first signal, and
   a modulator having a decoupling means for decoupling the tuned antenna circuit in the data carrier in response to data generated by the data carrier and thereby modulating the first signal with a second signal corresponding to said data and by means of said inductive coupling enabling the data to be transmitted from the data carrier to said remote receiver.

13. The system according to claim 3, wherein the supply means is coupled to the tuned antenna circuit and is responsive to the induced signal for supplying electric power to the data carrier.

14. The system according to claim 3, wherein the station further includes:
   a station control circuit for deactuating the station transmitter in response to second data stored in the station and, by means of said inductive coupling, deactuating the signal induced in the data carrier tuned antenna circuit;
   and the data carrier further includes a detector coupled to the data carrier tuned antenna circuit for detecting the state of the induced voltage of the data carrier tuned antenna circuit,
   a logic circuit coupled to the detector and responsive to said state, whereby an output of the logic circuit corresponds to the second data, and means for coupling the output of the logic circuit to a memory within the data carrier so as to store the second data therein.

15. In the system according to claim 3, a method for transmitting data from the data carrier to the station, comprising the steps of:

transmitting a logic reference bit having a predetermined time period, transmitting a plurality of bits corresponding to said data and having respective time periods, comparing, for each of said plurality of bits, the respective time period with the predetermined time period of the logic reference bit and assigning a respective logic level according to whether the respective time period is greater than or less than the predetermined time period.

16. In the system according to claim 14, a method for transmitting data from the station to the data carrier, comprising the steps of:

transmitting a logic reference bit having a predetermine time period, transmitting a plurality of bits corresponding to said data and having respective time periods, comparing, for each of said plurality of bits, the respective time period with the predetermined time period of the logic reference bit and assigning a respective logic level according to whether the respective time period is greater than or less than the predetermined period time period.

17. The method according to claim 15, within the reference bit or each of the plurality of bits are defined as the time period between pulses.

18. The method according to claim 15, wherein the reference bit or each of the plurality of bits are defined as the time period between logic changes.

19. The method according to claim 16, wherein the reference bit or each of the plurality of bits are defined as the time period between pulses.

20. The method according to claim 16, wherein the reference bit or each of the plurality of bits are defined as the time period between logic changes.

21. The system according to claim 1, wherein said matched station antenna includes a matching network which matches an antenna impedance to a cable characteristic impedance $Z_o$ to enable the system to operate at various lengths of cable without requiring a retuning of the system.

* * * * *